US012424093B2

(12) United States Patent
Park et al.

(10) Patent No.: US 12,424,093 B2
(45) Date of Patent: Sep. 23, 2025

(54) METHOD AND APPARATUS FOR GENERATING SAFETY CONTROL SIGNAL NOTIFYING RISK OF ACCIDENT ON ROAD

(71) Applicant: NOTA, INC., Daejeon (KR)

(72) Inventors: Hwan Hyo Park, Seoul (KR); Dong Ho Ka, Daejeon (KR); Tae Seong Moon, Seoul (KR)

(73) Assignee: NOTA, INC., Daejeon (KR)

( * ) Notice: Subject to any disclaimer, the term of this patent is extended or adjusted under 35 U.S.C. 154(b) by 148 days.

(21) Appl. No.: 18/452,955

(22) Filed: Aug. 21, 2023

(65) Prior Publication Data

US 2024/0071219 A1 Feb. 29, 2024

(30) Foreign Application Priority Data

Aug. 24, 2022 (KR) ........................ 10-2022-0105907
Mar. 21, 2023 (KR) ........................ 10-2023-0036845

(51) Int. Cl.
*G08G 1/0967* (2006.01)

(52) U.S. Cl.
CPC .................................. *G08G 1/0967* (2013.01)

(58) Field of Classification Search
CPC .................................................... G08G 1/0967
See application file for complete search history.

(56) References Cited

FOREIGN PATENT DOCUMENTS

| | | | | |
|---|---|---|---|---|
| JP | 2008-003707 | A | | 1/2008 |
| KR | 10-2006-0092909 | A | | 8/2006 |
| KR | 20060092909 | A | * | 8/2006 |
| KR | 10-2014-0106883 | A | | 9/2014 |
| KR | 10-2016-0092959 | A | | 8/2016 |
| KR | 20160092959 | A | * | 8/2016 |
| KR | 101861208 | B1 | * | 6/2018 |
| KR | 10-230583 | B1 | | 10/2019 |
| KR | 102030583 | B1 | * | 10/2019 |
| KR | 10-2280338 | B1 | | 7/2021 |

* cited by examiner

*Primary Examiner* — Curtis A Kuntz
*Assistant Examiner* — James E Munion
(74) *Attorney, Agent, or Firm* — Sughrue Mion, PLLC

(57) ABSTRACT

Provided are a method and apparatus for generating a safety control signal of a road. The method includes inputting road state information for a first time point, including a safety control signal for the first time point and dynamic information for the first time point obtained from a video of a road, to a prediction model, inferring dangerous situation prediction information for a second time point after the first time point, by using the prediction model, and generating a safety control signal notifying a risk of accident on the road for the second time point, based on the inferred dangerous situation prediction information, wherein the prediction model is trained by using a loss function configured by dangerous situation prediction information inferred for a specific time point from road state information before the specific time point, and dangerous situation measurement information calculated from road state information for the specific time point.

17 Claims, 10 Drawing Sheets

FIG. 5

500

| | Class | Score (Level) |
|---|---|---|
| PRIMARY DANGEROUS SITUATION PREDICTION INFORMATION | Car-to-car | 12(1) |
| | Car-to-person | 56(3) |
| | Car only | 4(1) |
| | etc. | 0(1) |
| SECONDARY DANGEROUS SITUATION PREDICTION INFORMATION | Car-to-car | 48(3) |
| | Car-to-person | 74(4) |
| | Car only | 9(1) |
| | etc. | 1(1) |

METHOD AND APPARATUS FOR GENERATING SAFETY CONTROL SIGNAL NOTIFYING RISK OF ACCIDENT ON ROAD

CROSS-REFERENCE TO RELATED APPLICATION

This application is based on and claims priority under 35 U.S.C. § 119 to Korean Patent Application Nos. 10-2022-0105907, filed on Aug. 24, 2022, 10-2023-0036845, filed on Mar. 21, 2023, in the Korean Intellectual Property Office, the disclosure of which is incorporated by reference herein in its entirety.

BACKGROUND

1. Field

The disclosure relates to a method and apparatus for generating a safety control signal notifying a risk of accident on a road.

2. Description of the Related Art

Recently, the use of an intelligent transport system (ITS) is increasing for an increase in traffic information demands and efficient use of roads for road users.

In particular, various methods have been proposed to prevent an accident on a road where a risk of traffic accident is high, such as an intersection or a right-turn lane.

For a vehicle being driven, a technique for estimating a short-term trajectory by using a Kalman filter or the like may be used. However, regarding a crosswalk, it is difficult to estimate a trajectory of a vehicle depending on a spatial characteristic of the crosswalk and a turning intention of a vehicle, and it is also difficult to predict the severity of a dangerous situation due to traffic lights and a walking intention of a pedestrian.

To efficiently prevent an accident, the accuracy of a model predicting a dangerous situation needs to be improved and individual improvement of the model is required depending on individual environments.

The aforementioned background technology is technical information possessed by the inventor for derivation of the disclosure or acquired by the inventor during the derivation of the disclosure, and is not necessarily prior art disclosed to the public before the application of the disclosure.

SUMMARY

Provided are a method and apparatus for generating a safety control signal notifying a risk of accident on a road.

Additional aspects will be set forth in part in the description which follows and, in part, will be apparent from the description, or may be learned by practice of the presented embodiments of the disclosure.

According to an aspect of the disclosure, a method of generating a safety control signal of a road, includes inputting road state information for a first time point, including a safety control signal for the first time point and dynamic information for the first time point obtained from a video of a road, to a prediction model, inferring dangerous situation prediction information for a second time point after the first time point, by using the prediction model, and generating a safety control signal notifying a risk of accident on the road for the second time point, based on the inferred dangerous situation prediction information, wherein the prediction model is trained by using a loss function configured by dangerous situation prediction information inferred for a specific time point from road state information before the specific time point, and dangerous situation measurement information calculated from road state information for the specific time point.

According to another aspect of the disclosure, an apparatus for generating a safety control signal of a road, includes a memory storing at least one program, and at least one processor configured to execute the at least one program to input road state information for a first time point, including a safety control signal for the first time point and dynamic information for the first time point obtained from a video of a road, to a prediction model, infer dangerous situation prediction information for a second time point after the first time point, by using the prediction model, and generate a safety control signal notifying a risk of accident on the road for the second time point, based on the inferred dangerous situation prediction information, wherein the prediction model is trained by using a loss function configured by dangerous situation prediction information inferred for a specific time point from road state information before the specific time point, and dangerous situation measurement information calculated from road state information for the specific time point.

According to another aspect of the disclosure, a computer-readable recording medium has recorded thereon a program for executing the method above on a computer.

In addition, provided are other methods and apparatuses for implementing the disclosure, and computer-readable recording media having recorded thereon programs for executing the other methods.

Other aspects, features, and advantages may become clear from the following drawings, the claims, and the detailed description of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates dangerous situation prediction information according to an embodiment;

DETAILED DESCRIPTION

Advantages and features of the disclosure and methods of accomplishing the same may be understood more readily by reference to the following detailed description of the embodiments and the accompanying drawings. However, it should be understood that the disclosure is not limited to the embodiments presented below, but may be implemented in various different forms, and include all transformations, equivalents, and substitutes included in the scope of the disclosure. The embodiments presented below are provided to complete the disclosure and to fully inform one of ordinary skill in the art of the scope of the disclosure. In the description of the disclosure, certain detailed explanations of related art are omitted when it is deemed that they may unnecessarily obscure the essence of the disclosure.

Also, the terms used in the present specification are only used to describe specific embodiments, and are not intended to limit the disclosure. An expression used in the singular encompasses the expression in the plural, unless it has a clearly different meaning in the context. In the present specification, it is to be understood that terms such as "including" or "having", etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

Some embodiments of the disclosure may be represented by functional block configurations and various processing operations. Some or all of these functional blocks may be implemented by various numbers of hardware and/or software configurations that perform particular functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented by algorithms executed in one or more processors. In addition, the disclosure may employ general techniques for electronic environment setting, signal processing, and/or data processing. Terms such as "mechanism", "element", "means", and "configuration" may be used widely and are not limited as mechanical and physical configurations.

In addition, a connection line or a connection member between components shown in drawings is merely a functional connection and/or a physical or circuit connection. In an actual device, connections between components may be represented by various functional connections, physical connections, or circuit connections that are replaceable or added.

Hereinafter, the disclosure will be described in detail with reference to accompanying drawings.

Figure 1:
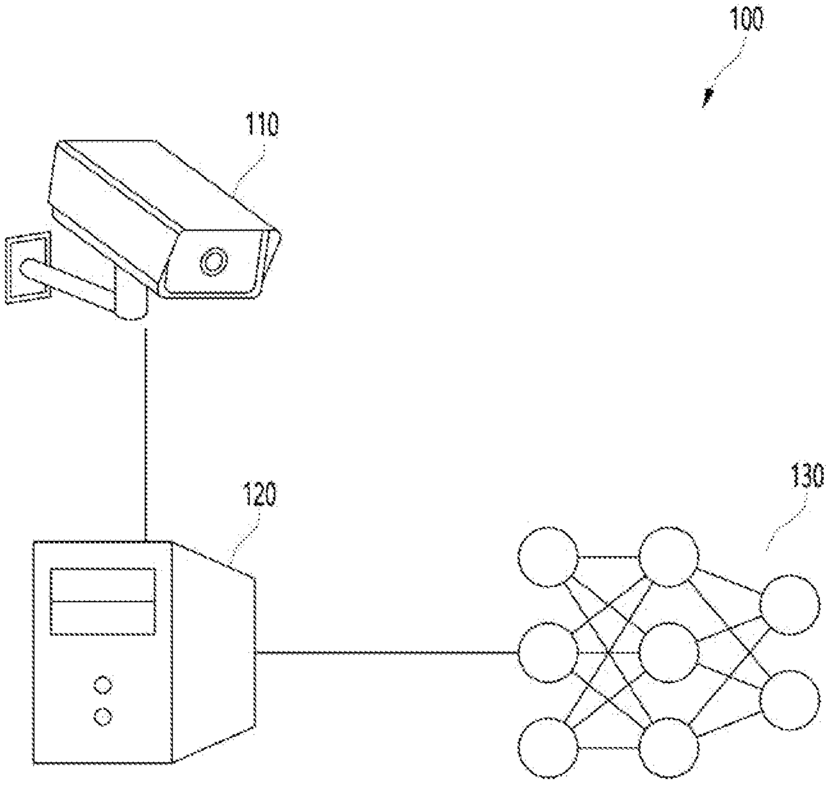
FIG. 1 is an implementation diagram of an apparatus for generating a safety control signal of a road, according to an embodiment.

FIG. 1 is an implementation diagram of an apparatus 120 for generating a safety control signal of a road, according to an embodiment.

Referring to FIG. 1, an implemented environment 100 of the apparatus 120 for generating a safety control signal of a road may include at least one sensor 110, the apparatus 120, and a prediction model 130.

In FIG. 1, the sensor 110 and the prediction model 130 are illustrated as separate components present outside the apparatus 120, but the sensor 110 and the prediction model 130 may be included in the apparatus 120.

The sensor 110 may include a photographing device for taking a video (hereinafter, a video of a road) of a certain road environment. The sensor 110 may include a photographing device or a sensor configured to take a video of a wavelength in a certain range, such as visible light or infrared light. Accordingly, the sensor 110 may obtain the video of the road by taking a video of different wavelength areas depending on a daytime, a nighttime, or a present situation. Here, the sensor 110 may obtain the video of the road at pre-set intervals. The video of the road includes an image of the road.

The sensor 110 may include, in addition to the photographing device, a device such as radio detection and ranging (RADAR) or light detection and ranging (LiDAR). Here, the video of the road may include not only the image of the road, but also a plurality of measurement points, which are sensing results of RADAR and/or LiDAR for the road. For example, when the sensor 110 is RADAR, the sensor 110 may emit radio waves and obtain the plurality of measurement points by detecting reflected waves incident by being reflected from a surrounding object. The apparatus 120 or the sensor 110 may obtain the video of the road by converting the plurality of measurement points into a point group or vector data and schematizing the same.

The apparatus 120 may obtain the video of the road, based on data obtained from each of the different sensors 110, or obtain dynamic information from the video of the road. In other words, the apparatus 120 may use the data obtained by different types of sensors 110 at the same time.

The video of the road may include a road environment with a high risk of traffic accident, such as an intersection or a right-turn lane. Also, the video of the road may include a crosswalk area. The sensor 110 may be provided on a road, in particular, a local area where a risk of traffic accident is high.

The apparatus 120 may extract the dynamic information, based on the video of the road obtained by the sensor 110. The dynamic information may be information about movement of a dynamic object (a vehicle, a pedestrian, or the like) included in the video of the road.

The apparatus 120 may input road state information including the dynamic information to the prediction model 130.

The prediction model 130 may predict a dangerous situation that may occur in a certain road environment. The prediction model 130 may be a neural network model and accuracy of prediction thereof may be improved through learning and training. For example, regarding a crosswalk, it is practically difficult to accurately predict a dangerous situation because it is difficult to analyze dynamic information and there are many variables. Accordingly, it is important to continuously update the prediction model 130 to prevent a traffic accident from occurring.

The apparatus 120 may infer dangerous situation prediction information by using the prediction model 130. For example, the apparatus 120 may infer the dangerous situation prediction information at pre-set intervals. Here, the pre-set interval may be the same as an interval for obtaining a video of a certain road environment. Hereinafter, the pre-set interval will be referred to as a sampling interval.

The apparatus 120 may generate a safety control signal after a certain time, by receiving the dangerous situation prediction information from the prediction model 130. Also, the apparatus 120 may transmit the safety control signal to a vehicle on the road, a safety controller on the road, and a control center.

Figure 2:
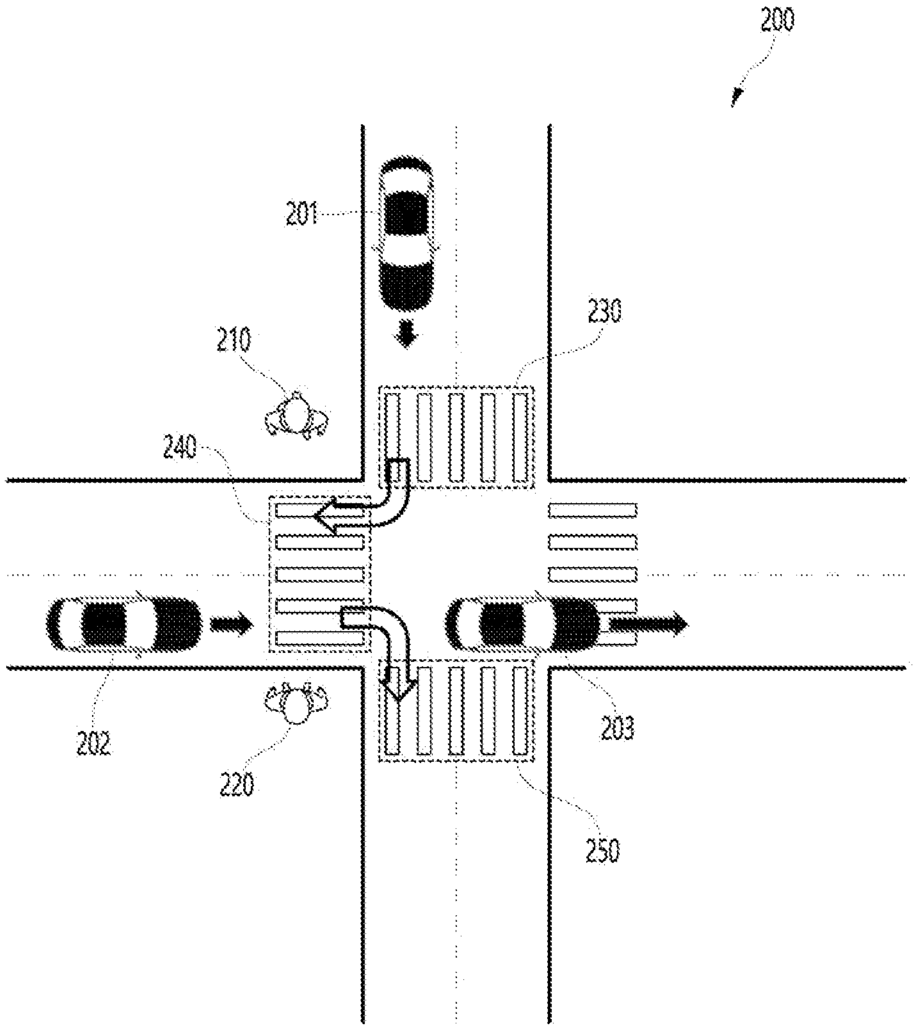
FIG. 2 is a schematic view of a video of a road, according to an embodiment.

FIG. 2 is a schematic view of a video 200 of a road, according to an embodiment.

Referring to FIG. 2, the video 200 of the road obtained by a sensor is represented as a front view looking down on the road vertically from the above, but the video 200 of the road may have any one of various compositions according to installed locations, installed heights, and photographing angles of the sensor.

According to an embodiment, the video 200 of the road may include a dynamic object. Examples of the dynamic object include vehicles 201, 202, and 203, and pedestrians 210 and 220. Also, the video 200 of the road may include a safety controller (not shown).

Examples of the safety controller include a light signal configured to emit or flicker light (e.g., light-emitting diode) to indicate a danger notification signal to a vehicle driver and a pedestrian, an acoustic signal configured to output voice, a sign signal controlled to call attention of a vehicle driver and a pedestrian, and a blocking signal configured to physically block movement of a vehicle and a pedestrian.

Another example of the safety controller may include a transmitter configured to transmit a danger signal to an autonomous vehicle or a vehicle with an on-board unit (OBU). In detail, the safety controller may indicate the danger notification signal, based on a method of transmitting a message to an autonomous vehicle or a peripheral vehicle with OBU. Here, the message may be a road side alert (RSA) message, and the RSA message may include information about a type, location, and time of a dangerous situation. Meanwhile, the transmitter may perform unidirectional or bi-directional communication, based on a communication technology, such as dedicated short-range communication (DSRC), long-term evolution (LTE), or 5th generation (5G).

According to an embodiment, an apparatus for generating a safety control signal of a road (hereinafter, simply referred to as an apparatus) may extract dynamic information, based on the video 200 of the road.

The dynamic information may include, with respect to the one or more vehicles 201, 202, and 203 approaching a crosswalk, trajectories, speeds, accelerations, locations, and heading directions of the vehicles 201, 202, and 203. Also, the dynamic information may include, with respect to the one or more pedestrians 210 and 220 walking near the crosswalk or crossing the crosswalk, trajectories, speeds, accelerations, and locations of the pedestrians 210 and 220. Here, the locations of the vehicles 201, 202, and 203 and the pedestrians 210 and 220 may be defined as relative locations with respect to a crosswalk area.

Also, the dynamic information may include all pieces of information that may be expressed by standardizing drivers of the vehicles 201, 202, and 203 and the pedestrians 210 and 220. For example, the dynamic information may include information about directions the drivers of the vehicles 201, 202, and 203 and the pedestrians 210 and 220 are looking at.

According to an embodiment, the video 200 of the road may include a safety control signal indicated on the road. For example, The safety control signal may be displayed on the video 200 of the road by being applied to the road at a time point when the video 200 of the road is taken, based on dangerous situation prediction information inferred before the time point when the video 200 of the road is taken.

The video 200 of the road may include an intersection and a crosswalk. The crosswalk may be divided into a primary crosswalk and a secondary crosswalk, based on a right-turn lane of an intersection. The primary crosswalk and the secondary crosswalk may be determined relatively, based on the right-turn lane.

For example, when the vehicle 201 is turning right, there may be two crosswalks 230 and 240 on the right-turn lane. In this case, the crosswalk 230 that is located in front of the right-turn lane, which the right turn vehicle 201 encounters immediately before turning right may be the primary crosswalk. Also, the crosswalk 240 that is located at a side of the right-turn lane, which the right turn vehicle 201 encounters immediately after turning right may be the secondary crosswalk.

Similarly, when the vehicle 202 is turning right, there may be two crosswalks 240 and 250 on the right-turn lane. In this case, the crosswalk 240 that is located in front of the right-turn lane, which the right turn vehicle 202 encounters immediately before turning right may be the primary crosswalk. Also, the crosswalk 250 that is located at a side of the right-turn lane, which the right turn vehicle 202 encounters immediately after turning right may be the secondary crosswalk.

In other words, the crosswalk 240 is relatively determined to be the primary crosswalk or the secondary crosswalk, based on the right-turn lane.

Referring to the video 200 of the road, there may be various dangerous situations in an intersection. For example, when the vehicles 201 and 202 are turning right, there may be dangerous situations with respect to the pedestrians 210 and 220. Here, severity of each dangerous situation may vary.

In detail, when the vehicle 201 is traveling towards the primary crosswalk 230 while going slowly or slowing down, with respect to the pedestrian 210 walking to cross the secondary crosswalk 240, a collision probability in the primary crosswalk 230 may be close to 0 and a collision probability in the secondary crosswalk 240 may also be relatively low.

Also, when the vehicle 202 is traveling towards the primary crosswalk 230 while not going slowly or not slowing down, with respect to the pedestrian 220 standing still while facing the primary crosswalk 240, a collision probability in the primary crosswalk 240 may be relatively low and a collision probability in the secondary crosswalk 250 may be close to 0.

Also, when the vehicle 203 passes the primary crosswalk 240 while not going slowly or not slowing down, the it may be determined that the vehicle 203 has no intention of turning right and will continue to travel on a straight lane. Here, with respect to the pedestrians 210 and 220, a collision probability of the vehicle 203 may be close to 0.

In the above-described embodiment, a collision (in detail, a collision between a pedestrian and a vehicle) may correspond to a type of a dangerous situation, and a collision probability may correspond to severity of a dangerous situation. As will be described below, a prediction model is configured to infer types of various dangerous situations defined according to traffic engineering, and dangerous situation type-wise severity, and output an inferred prediction value as dangerous situation prediction information.

Figure 3:
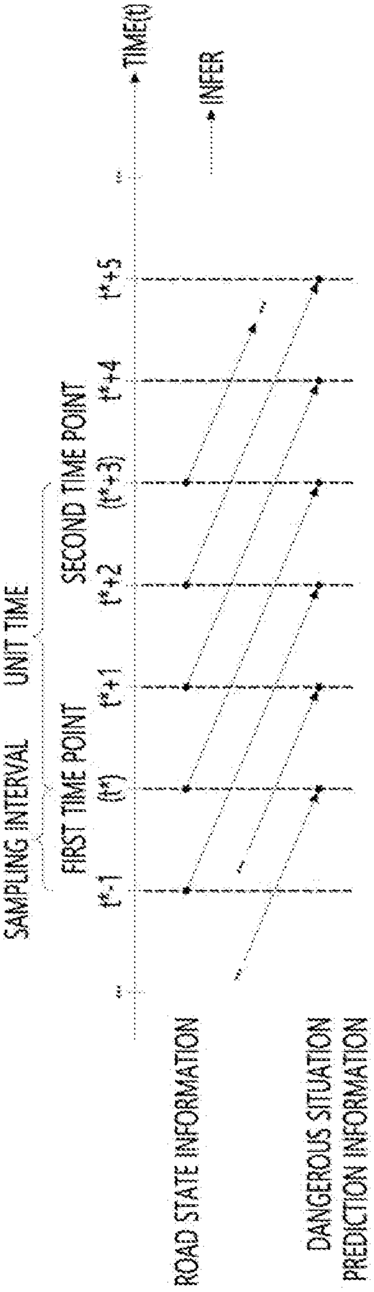
FIG. 3 is a diagram for describing a method of inferring dangerous situation prediction information by using a prediction model, according to an embodiment.

FIG. 3 is a diagram for describing a method of inferring dangerous situation prediction information by using a prediction model, according to an embodiment.

The apparatus may input, to a prediction model, road state information for a first time point t*.

According to an embodiment, the road state information may include dynamic information and a safety control signal described above. Also, the road state information may further include traffic signal information of a road and/or environment information of the road.

The traffic signal information may include lighting and flickering information of a vehicle signal at an intersection, and lighting and flickering information of a pedestrian signal at a crosswalk. For example, the traffic signal information may include current indication information, a remaining time, and next indication information of a signal. For example, when the current indication information is a red signal, the remaining time is 5 seconds, and the next indication information is a green signal, severity of a dangerous situation may be inferred to be high.

The environment information may include environmental information related to factors that affect a possibility of dangerous situation on a road, such as a time (including sunset), weather, and fine dust concentration. Also, the environment information may include information related to road traffic, such as the number of lanes on a road, the number of left-turn lanes, and traffic laws applied to a road. Accordingly, the prediction model may be trained based on the environment information fixed for each site where the apparatus is installed, and thus a prediction model update method optimized to the installed site may be provided.

According to an embodiment, the apparatus may infer dangerous situation prediction information for a second time point t*+3 after the first time point t*, by using the prediction model. Dangerous situation prediction information for a specific time point may denote a dangerous situation and severity of the dangerous situation in a road environment for the specific time point. For example, when a second time point is 3 seconds after the present (a first time point), dangerous situation prediction information for the second time point may denote a dangerous situation and severity of the dangerous situation in a road environment after 3 seconds. The dangerous situation prediction information for the second time point has been inferred by using a prediction model, and thus a result value may be output before the second time point arrives.

A sampling interval t=1 may denote an interval at which the apparatus infers the dangerous situation prediction information, an interval at which the apparatus obtains a video of the road, or an interval at which the apparatus receives road state information.

Referring to FIG. 3, the apparatus may infer the dangerous situation prediction information for a time point after a unit time by using the prediction model. In FIG. 3, the second time point t*+3 is a time point after 3 sampling intervals from the first time point t*, but this is only an example and the unit time is not limited thereto.

According to an embodiment, the apparatus may infer the dangerous situation prediction information for the second time point t*+3 after the first time point t*, by using the prediction model. Alternatively, the prediction model may infer the dangerous situation prediction information for the second time point t*+3 at the first time point t*, and the apparatus may receive the dangerous situation prediction information from the prediction model.

Figure 4:
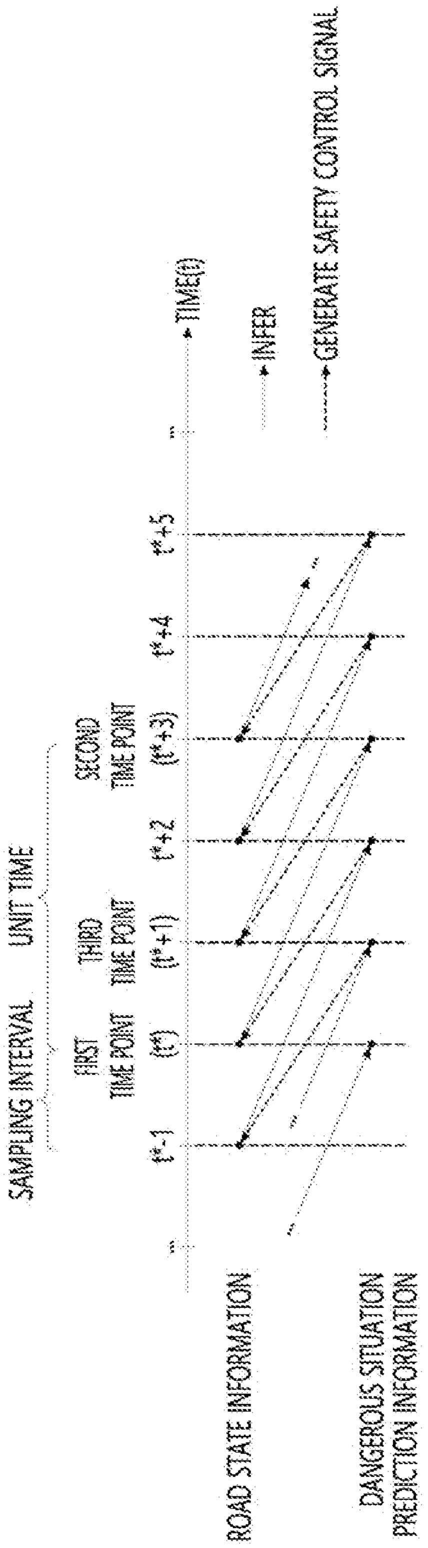
FIG. 4 is a diagram for describing a process of using a safety control signal while inferring dangerous situation prediction information, according to an embodiment.

FIG. 4 is a diagram for describing a process of using a safety control signal while inferring dangerous situation prediction information, according to an embodiment.

According to an embodiment, the apparatus may generate a safety control signal for a third time point after the first time point t* (the third time point is the same as or before the second time point t*+3. For example, t*+1). The safety control signal for the third time point t*+1 may denote a safety control signal applied to a road at the third time point t*+1. Accordingly, when a prediction model has inferred that a probability of a dangerous situation after a unit time is high, the safety control signal after a sampling interval may be pre-generated and applied to the road to prevent the dangerous situation from occurring.

Hereinafter, it is described that the third time point t*+1 is a time point after a first sampling interval from the first time point t*, but the third time point t*+1 may denote a time point same as or before the second time point t*+3 and after the first time point t*.

According to an embodiment, the apparatus may input, to the prediction model, road state information for the third time point t*+1 and infer dangerous situation prediction information for a time point t*+4 after the third time point t*+1 by using the prediction model. Here, the road state information for the third time point t*+1 is road state information to which the safety control signal generated at the first time point t* is applied. In other words, the road state information for the third time point t*+1 includes the safety control signal and dynamic information to which movements of dynamic objects on the road are reflected as the dynamic objects recognize the safety control signal.

For example, when it is determined that a collision probability of a vehicle and a pedestrian is very high as a result of the apparatus inferring, at the first time point t*, dangerous situation prediction information for the second time point t*+3, the safety control signal for the third time point t*+1 may be generated and applied to the road. The safety control signal for the third time point t*+1 generated based on the dangerous situation prediction information for the second time point t*+3 may be a safety control signal notifying a risk of accident on the road for the second time point t*+3.

Meanwhile, the safety control signal may be displayed to the vehicle and the pedestrian on the road, and thus a rapid change in the dynamic information (deceleration of the vehicle or a temporary halt of the pedestrian) may occur. Such a rapid change in the dynamic information for the third time point t*+1 is input to the prediction model, as the road state information.

As such, the apparatus may repeat inference and safety control signal generation every sampling interval. The generated safety control signal may be input to the prediction model for inference for a next sampling interval.

According to the above-described description, the safety control signal for the first time point t* included in the road state information for the first time point t* may be generated based on the dangerous situation prediction information for a time point (for example, the time point t*+2) after the first time point t* and applied to the road at the first time point t*. Here, the dangerous situation prediction information for the time point t*+2 after the first time point t* may be information inferred before the first time point (for example, before a time point t*−1).

FIG. 5 illustrates dangerous situation prediction information 500 according to an embodiment.

The apparatus may input dynamic information and a safety control signal to a prediction model and infer the dangerous situation prediction information 500 by using the prediction model.

Referring to FIG. 5, the dangerous situation prediction information 500 may include a dangerous situation type (class) and a dangerous situation type-wise severity (score).

The dangerous situation type (class) denotes an accident type defined according to traffic engineering. For example, the dangerous situation type includes a car-to-person accident, a car-to-car accident, a car only accident, and the like.

Although not shown in FIG. 5, a detailed type of the car-to-car accident includes a side right angle collision, a rear-end collision, a head-on collision, or the like.

The dangerous situation type-wise severity may be a numerical value indicating a possibility that a dangerous situation may occur for each dangerous situation type. The dangerous situation type-wise severity may be indicated by a score or a level.

According to an embodiment, when a score or a level of the dangerous situation type-wise severity corresponds to a pre-set specific range, the apparatus may generate a safety control signal corresponding to the specific range. For example, when the dangerous situation type-wise severity is level 3, the apparatus may display LED through a light signal. Alternatively, for example, when the dangerous situation type-wise severity is level 4, the apparatus may flicker the LED through the light signal at intervals of 0.1 seconds while simultaneously outputting voice through an acoustic signal to call attention of a vehicle driver and a pedestrian.

The dangerous situation prediction information 500 may be classified for each of a primary crosswalk and a secondary crosswalk. In other words, the dangerous situation prediction information 500 may include primary dangerous situation prediction information including dangerous situation type-wise severity of the primary crosswalk and secondary dangerous situation prediction information including dangerous situation type-wise severity of the secondary crosswalk.

For example, a situation in which dangerous situation type-wise severity increases may be as below. The dangerous situation type-wise severity may increase when a speed of a vehicle entering a primary crosswalk is high or an arrival time of the vehicle is short, when there is a stationary vehicle near a primary crosswalk and a secondary crosswalk, when the time is after the sunset, when an anterior vision of a vehicle is blur due to fog, fine dusts, or the like, when a vehicle is a truck, a bus, a motorcycle, or the like, and when a pedestrian is the weak, such as a child or a senior and disabled.

Figure 6:
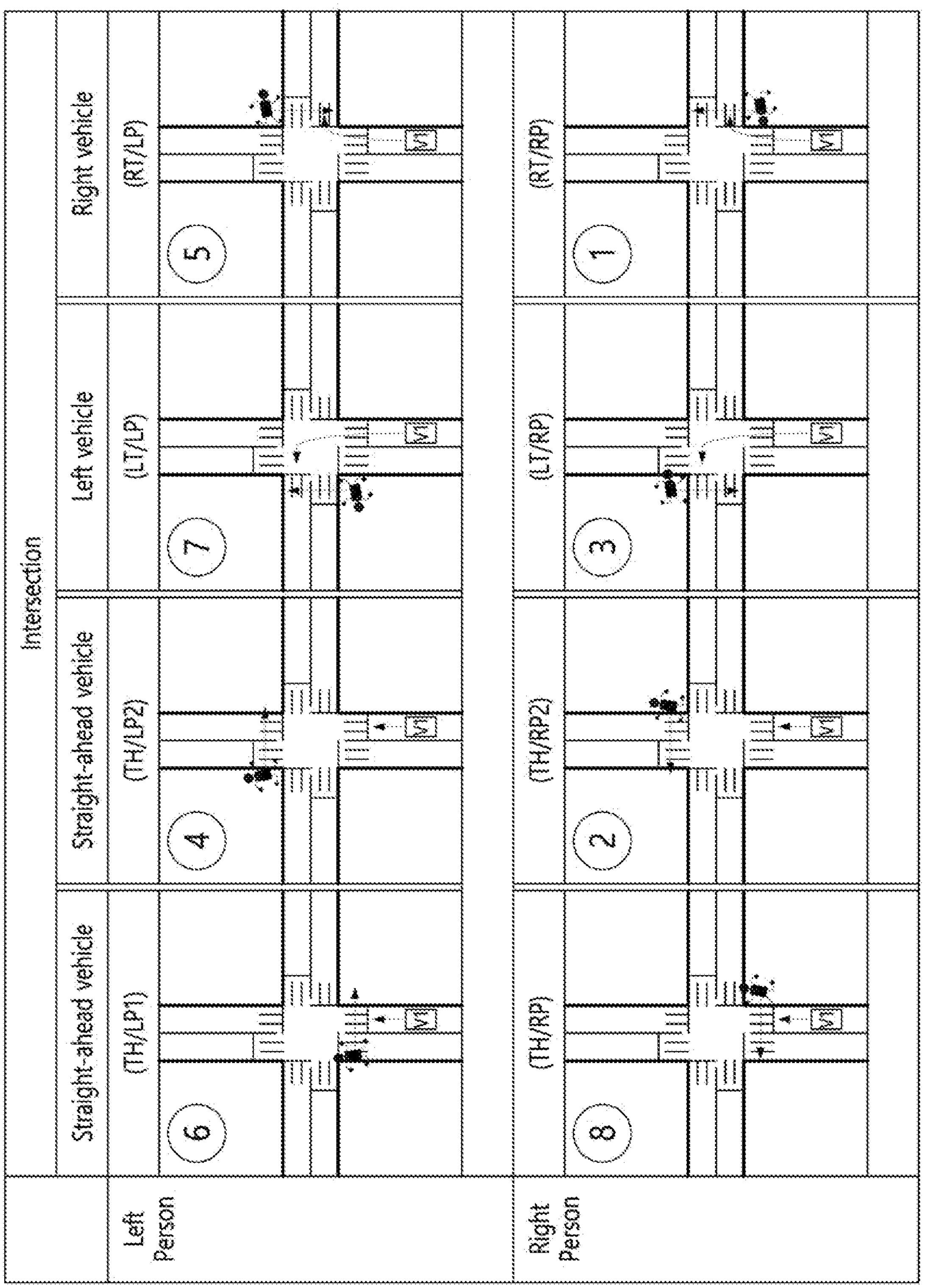
FIG. 6 is a diagram for describing a process of calculating dangerous situation measurement information, according to an embodiment.

FIG. 6 is a diagram for describing a process of calculating dangerous situation measurement information, according to an embodiment.

According to an embodiment, the apparatus may calculate dangerous situation measurement information for a specific time point, form road state information up to the specific time point. Dangerous situation measurement information may be a result of evaluating a degree of risk for a dangerous situation for a specific time point, by using a traffic engineering index.

For example, the apparatus may calculate dangerous situation measurement information for a second time point, based on road state information accumulated from a first time point to the second time point. In detail, the apparatus may quantitatively calculate a degree of risk for the second time point, based on dynamic information accumulated from the first time point to the second time point.

According to an embodiment, the apparatus may calculate the dangerous situation measurement information by estimating a pedestrian safety margin (PSM). The PSM denotes a time interval between an arrival of a pedestrian at a crossing and a vehicle approaching the crossing. To calculate the dangerous situation measurement information based on the PSM, the apparatus may use pieces of dynamic information of the vehicle and the pedestrian, which are accumulated from the first time point to the second time point.

In addition to the dynamic information, the road state information may further include a type of a vehicle, the volume of traffic of each lane, and an average headway time that is an average of headway intervals of all vehicles passing when each pedestrian approaches a curbstone for crossing. Also, the road state information may further include a pedestrian's gender and seniority, a crosswalk approach time that is a time difference between a pedestrian appears in a video of a road and stops at a curbstone, a crosswalk waiting time, the length of a crosswalk, the number of steps of a pedestrian, a stride length, a crossing speed, the number of gazes during a crosswalk waiting time, and the number of gases during crossing of a crosswalk. Also, the road state information may further include an expected collision point between a vehicle and a pedestrian.

According to another embodiment, the apparatus may calculate dangerous situation measurement information, based on at least one of a time to collision (TTC), a post encroachment time (PET), a deceleration rate (DR), a max speed (MaxS), and a delta speed (DeltaS). TTC denotes a time estimated until a collision when two vehicles travel on a same path as a present speed. PET denotes a time between a time point when encroachment of a roundabout vehicle on priority of a straight-ahead vehicle ends and a time point when a passing vehicle actually arrives at a potential collision point. DR denotes a length of time to a distance taken for a following vehicle to decelerate. MaxS denotes a maximum speed of a vehicle with a higher speed from among two vehicles. DeltaS denotes a relative speed of two vehicle.

In detail, when a value of TTC is low, a value of PET is high, and a value of DR is high, a risk of accident is high and thus a degree of risk for a dangerous situation may be evaluated to be high, and when a value of DeltaS is high, severity is high if an accident occurs, and thus a risk of accident for a dangerous situation may also be evaluated to be high.

Meanwhile, the apparatus may calculate the above-described indexes, based on dynamic information of a vehicle and/or a pedestrian.

Referring to FIG. 6, collision types at an intersection are classified.

Figure 7:
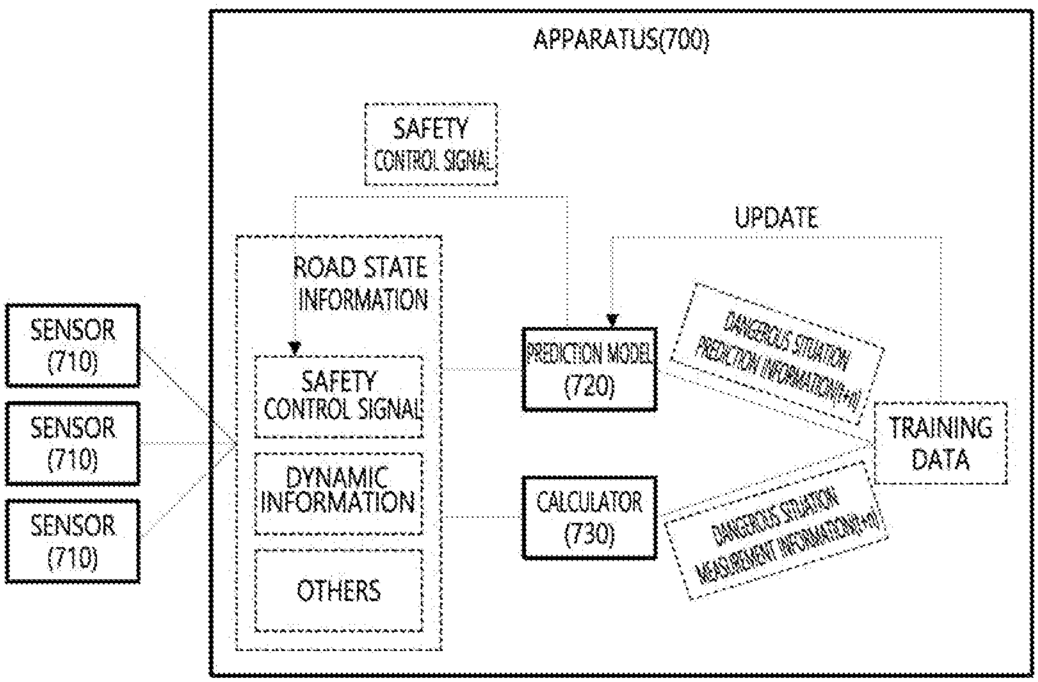
FIG. 7 is a diagram for describing a process of updating a prediction model, according to an embodiment.

FIG. 7 is a diagram for describing a process of updating a prediction model 720, according to an embodiment.

Referring to FIG. 7, an apparatus 700 may update the prediction model 720. In FIG. 7, a sensor 710 is not included in the apparatus 700, but the sensor 710 may be included in the apparatus 700. Also, in FIG. 7, the prediction model 720 is included in the apparatus 700, but the prediction model 720 may be present separate from the apparatus 700 or may be a neural network model by which an external server performs an operation.

In an embodiment below, t may denote a first time point and t+n may denote a second time point.

According to an embodiment, the apparatus 700 may extract dynamic information for the first time point from a video of a road obtained by the sensor 710. Also, the apparatus 700 may obtain a safety control signal for the first time point. Also, the apparatus 700 may further obtain traffic signal information and environment information of the road.

According to an embodiment, the apparatus 700 may input road state information for the first time point to the prediction model 720. A process by which the prediction model 720 infers dangerous situation prediction information for the second time point has been described above.

According to an embodiment, the apparatus 700 may calculate the dangerous situation measurement information for a second time point, based on road state information from the first time point to the second time point. In detail, the apparatus 700 may separately include a calculator 730 to calculate the dangerous situation measurement information for the second time point.

According to an embodiment, the apparatus 700 may accumulatively store the road state information for the first time point, the dangerous situation prediction information for the second time point, which is inferred at the first time point, and the dangerous situation measurement information for the second time point, which is calculated at the second time point. In this regard, the apparatus 700 may separately include a storage unit (not shown).

According to an embodiment, the apparatus 700 may update the prediction model 720, based on pieces of information accumulated and stored in the storage unit. For example, the apparatus 700 may train the prediction model 720 by using a loss function configured by the dangerous situation prediction information for the second time point and the dangerous situation measurement information for the second time point.

The loss function may be alternatively configured by dangerous situation prediction information inferred for a specific time point from a road state information before the specific time point, and dangerous situation measurement information calculated from road state information for the specific time point. Here, the loss function may correspond to a difference between the dangerous situation prediction information for the second time point and the dangerous situation measurement information for the second time point, or correspond to a value proportional to the difference.

According to an embodiment, the apparatus 700 may generate training data for updating the prediction model 720, based on pieces of information accumulated and stored in the storage unit.

The apparatus 700 may update the prediction model 720 every update interval such that the loss function has a minimum value, based on the training data. For example, the apparatus 700 may generate the training data every sampling interval, while updating the prediction model 720 according to update intervals instead of the sampling interval or an interval according to a unit time. Here, the update interval may be pre-set or arbitrarily set.

Figure 8:
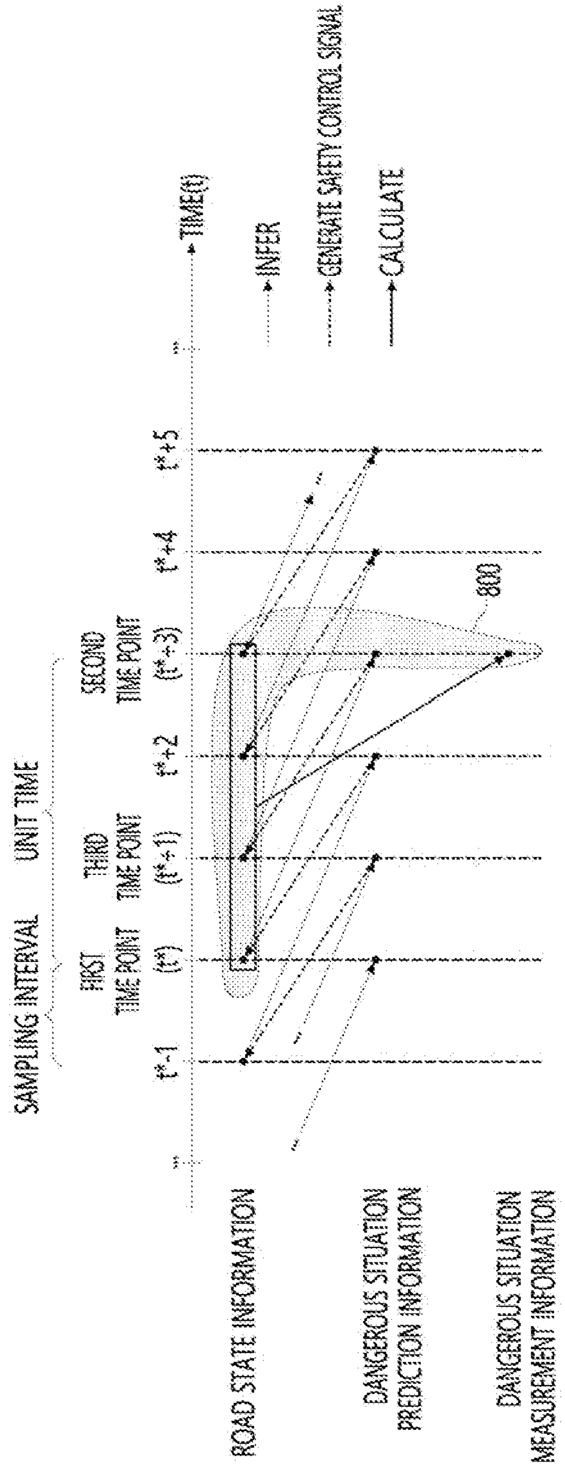
FIG. 8 is a diagram for describing a method of configuring training data, according to an embodiment.

FIG. 8 is a diagram for describing a method of configuring training data 800, according to an embodiment.

Referring to FIG. 8, an embodiment of configuring the training data 800 is illustrated. For convenience of description, only the training data 800 configured based on information for a second time point is illustrated.

The training data 800 may be generated based on road state information for a first time point, dangerous situation prediction information for the second time point, and dangerous situation measurement information for the second time point. In other words, the apparatus may generate the training data 800, based on the road state information for the first time point, the dangerous situation prediction information for the second time point, and the dangerous situation measurement information for the second time point, which are accumulated and stored.

According to an embodiment, the apparatus may generate the training data 800 by sampling the road state information for the first time point, the dangerous situation prediction information for the second time point, and the dangerous situation measurement information for the second time point, instead of all pieces of accumulated and stored information.

The training data 800 may be configured by road state information obtained from a certain road environment, such as a video of a road, dangerous situation prediction information inferred from a prediction model, and dangerous situation measurement information calculated from the road state information. Here, as described above, the road state information may include a safety control signal, which is generated based on dangerous situation prediction information inferred at a previous time point.

Figure 9:
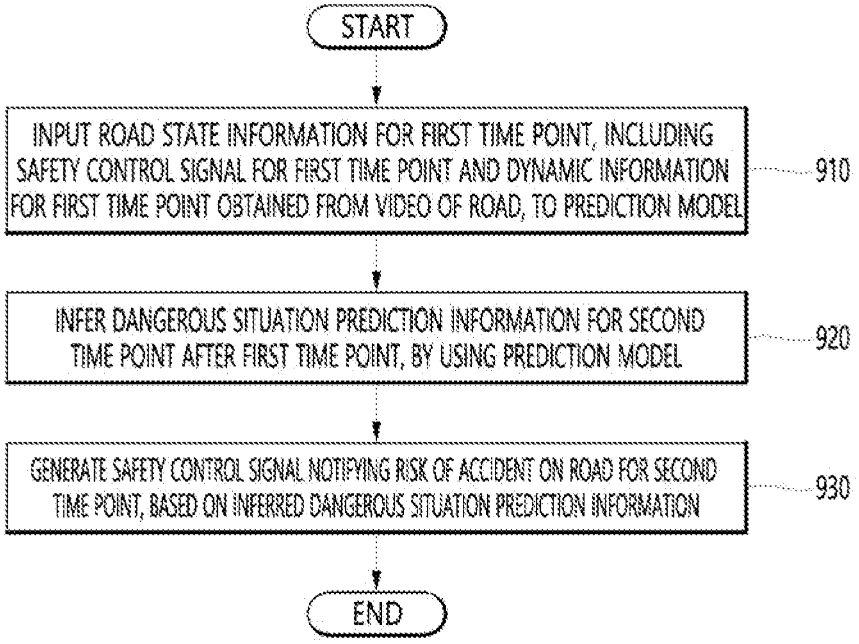
FIG. 9 is a flowchart of a method of generating a safety control signal of a road, according to an embodiment.

FIG. 9 is a flowchart of a method of generating a safety control signal of a road, according to an embodiment.

In operation 910, the apparatus may input road state information for a first time point, including dynamic information for the first time point obtained from a video of a road, and a safety control signal for the first time point, to a prediction model.

According to an embodiment, the video of the road may include a safety control signal indicated on the road.

According to an embodiment, the dynamic information may be information about movements of a vehicle and a pedestrian included in the video of the road.

According to an embodiment, the road state information may further include at least one of traffic signal information of the road and environment information of the road.

According to an embodiment, the road may include a right-turn lane, a primary crosswalk located on the right-turn lane, which a right-turn vehicle encounters immediately before turning right, and a secondary crosswalk located on the right-turn lane, which the right-turn vehicle encounters immediately after turning right.

According to an embodiment, the prediction model may be trained by using a loss function configured by dangerous situation prediction information inferred for a specific time point from a road state information before the specific time point, and dangerous situation measurement information calculated from road state information for the specific time point.

According to an embodiment, the safety control signal for the first time point may be generated based on dangerous situation prediction information inferred before the first time point by using the prediction model, and applied to the road at the first time point.

In operation 920, the apparatus may infer dangerous situation prediction information for a second time point after the first time point, by using the prediction model.

According to an embodiment, dangerous situation prediction information may include primary dangerous situation prediction information including dangerous situation type-wise severity of the primary crosswalk and secondary dangerous situation prediction information including dangerous situation type-wise severity of the secondary crosswalk.

In operation 930, the apparatus may generate a safety control signal notifying a risk of accident on the road for the second time point, based on the inferred dangerous situation prediction information.

According to an embodiment, the apparatus may calculate the dangerous situation measurement information for the second time point, based on road state information from the first time point to the second time point.

According to an embodiment, the dangerous situation measurement information may have been quantitatively calculated based on the dynamic information.

According to an embodiment, the apparatus may generate training data, based on the road state information for the first time point, the dangerous situation prediction information for the second time point, and the dangerous situation measurement information for the second time point.

According to an embodiment, the prediction model may be updated every update interval such that a loss function has a minimum value, based on the training data.

Figure 10:
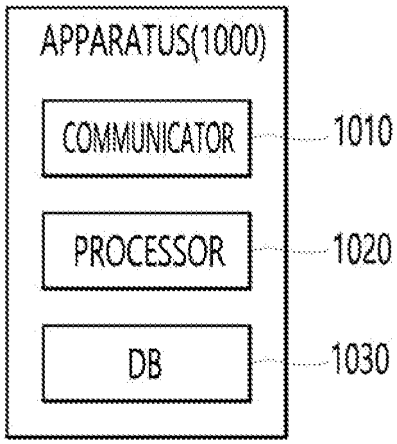
FIG. 10 is a block diagram of an apparatus for generating a safety control signal of a road, according to an embodiment.

FIG. 10 is a block diagram of an apparatus 1000 for generating a safety control signal of a road, according to an embodiment.

Referring to FIG. 10, the apparatus 1000 may include a communicator 1010, a processor 1020, and a database (DB) 1030. FIG. 10 illustrates only components of the apparatus 1000, which are related to an embodiment. Thus, it would be obvious to one of ordinary skill in the art that the apparatus 1000 may further include general-purpose components other than the components shown in FIG. 10.

The communicator 1010 may include one or more components enabling wired/wireless communication with an external server or an external device. For example, the communicator 1010 may include at least one of a short-range wireless communication unit (not shown), a mobile communication unit (not shown), and a broadcast receiver (not shown). According to an embodiment, the communicator 1010 may obtain a video of a road from a sensor outside the apparatus 1000. According to another embodiment, the communicator 1010 may transmit or receive data for generating a safety control signal of the road to or from a prediction model. According to another embodiment, the communicator 1010 may transmit a danger signal to an autonomous vehicle or a vehicle with OBU.

The DB 1030 is hardware storing various types of data processed in the apparatus 1000, and may store a program for processes and control by the processor 1020.

The DB 1030 may include a random access memory (RAM) such as a dynamic random access memory (DRAM) or a static random access memory (SRAM), a read-only memory (ROM), an electrically erasable programmable read-only memory (EEPROM), CD-ROM, Blu-ray or another optical disk storage, a hard disk drive (HDD), a solid state drive (SSD), or a flash memory.

The processor 1020 controls overall operations of the apparatus 1000. For example, the processor 1020 may execute programs stored in the DB 1030 to control an input unit (not shown), a display (not shown), the communicator 1010, and the DB 1030, in general. The processor 1020 may execute the programs stored in the DB 1030 to control operations of the apparatus 1000.

The processor 1020 may control at least some of operations of the apparatus for generating a safety control signal of a road, which have been described above with reference to FIGS. 1 through 9.

The processor 1020 may be realized by using at least one of an application-specific integrated circuit (ASIC), a digital signal processor (DSP), a digital signal processing device (DSPD), a programmable logic device (PLD), a field programmable gate array (FPGA), a controller, a micro-controller, a microprocessor, and electric units for performing other functions.

According to an embodiment, the apparatus 1000 may be a server. The server may be implemented as a computer device or a plurality of computer devices, which provide a command, code, file, content, and service by communicating through a network. The server may receive data required to generate a safety control signal of a road, and generate the safety control signal of the road, based on the received data.

According to embodiments of the disclosure, a traffic accident may be prevented by improving prediction accuracy of severity and a dangerous situation that may occur on a road.

Also, according to embodiments of the disclosure, a traffic accident may be prevented by generating and providing an effective safety control signal.

The embodiments according to the disclosure may be implemented in a form of a computer program executable by various components on a computer, and such a computer program may be recorded in a computer-readable medium. Here, the computer-readable medium may include hardware devices specially designed to store and execute program instructions, such as magnetic media, such as a hard disk, a floppy disk, and a magnetic tape, optical recording media, such as CD-ROM and DVD, magneto-optical media such as a floptical disk, and read-only memory (ROM), random-access memory (RAM), and a flash memory.

The computer program may be specially designed for the disclosure or well known to one of ordinary skill in the computer software field. Examples of the computer program include not only machine codes generated by a compiler, but also high-level language codes executable by a computer by using an interpreter or the like.

According to an embodiment, a method according to various embodiments of the disclosure may be provided by being included in a computer program product. The computer program products are products that can be traded between sellers and buyers. The computer program product may be distributed in a form of machine-readable storage medium (for example, a compact disc read-only memory (CD-ROM)), or distributed through an application store (for example, Play Store™) or directly or online between two user devices (for example, download or upload). In the case of online distribution, at least a part of the computer program product may be at least temporarily stored or temporarily generated in the machine-readable storage medium such as a server of a manufacturer, a server of an application store, or a memory of a relay server.

Unless an order is clearly stated or unless otherwise stated, operations configuring a method according to the disclosure may be performed in an appropriate order. The disclosure is not necessarily limited by an order the operations are described. In the disclosure, the use of all examples or exemplary terms (for example, "etc.") is merely for describing the disclosure in detail and the scope of the disclosure is not limited by those examples or exemplary terms unless defined in the claims. Also, it would be obvious to one of ordinary skill in the art that various modifications, combinations, and changes may be configured according to design conditions and factors within the scope of claims or equivalents.

Therefore, the scope of the disclosure should not be determined limitedly based on the above-described embodiments, and not only the appended claims but also all ranges equivalent to or equivalently changed from the claims are within the scope of the disclosure.

What is claimed is:

1. A method, performed by an apparatus comprising at least one processor, of generating a safety control signal of a road, the method comprising:

inputting road state information for a first time point, including a safety control signal for the first time point and dynamic information for the first time point obtained from a video of a road, to a prediction model;

inferring dangerous situation prediction information for a second time point after the first time point, by using the prediction model; and generating a safety control signal notifying a risk of accident on the road for the second time point, based on the inferred dangerous situation prediction information, wherein the prediction model is trained by using a loss function configured by dangerous situation prediction information inferred for a specific time point from road state information before the specific time point, and dangerous situation measurement information calculated from road state information for the specific time point, wherein the road comprises a right-turn lane, a primary crosswalk located on the right-turn lane, which a right-turn vehicle encounters before turning right, and a secondary crosswalk located on the right-turn lane, which the right-turn vehicle encounters after turning right, and wherein the dangerous situation prediction information comprises primary dangerous situation prediction information including a dangerous situation type-wise severity of the primary crosswalk, and secondary dangerous situation prediction information including dangerous situation type-wise severity of the secondary crosswalk.

2. The method of claim 1, wherein the safety control signal for the first time point is generated based on dangerous situation prediction information inferred before the first time point by using the prediction model, and is applied to the road at the first time point.

3. The method of claim 1, further comprising calculating dangerous situation measurement information for the second time point, based on road state information from the first time point to the second time point.

4. The method of claim 3, further comprising generating training data, based on the road state information for the first time point, the dangerous situation prediction information for the second time point, and the dangerous situation measurement information for the second time point.

5. The method of claim 4, wherein the prediction model is updated every update interval such that the loss function has a minimum value, based on the training data.

6. The method of claim 1, wherein the video of the road comprises a safety control signal indicated on the road.

7. The method of claim 3, wherein the dynamic information is information about movements of a vehicle and a pedestrian included in the video of the road, and the dangerous situation measurement information is quantitatively calculated based on the dynamic information.

8. The method of claim 1, wherein the road state information further comprises at least one of traffic signal information of the road and environment information of the road.

9. An apparatus for generating a safety control signal of a road, the apparatus comprising:

a memory storing at least one program; and at least one processor configured to execute the at least one program to:

input road state information for a first time point, including a safety control signal for the first time point and dynamic information for the first time point obtained from a video of a road, to a prediction model;

infer dangerous situation prediction information for a second time point after the first time point, by using the prediction model; and generate a safety control signal notifying a risk of accident on the road for the second time point, based on the inferred dangerous situation prediction information, wherein the prediction model is trained by using a loss function configured by dangerous situation prediction information inferred for a specific time point from road state information before the specific time point, and dangerous situation measurement information calculated from road state information for the specific time point, wherein the road comprises a right-turn lane, a primary crosswalk located on the right-turn lane, which a right-turn vehicle encounters before turning right, and a secondary crosswalk located on the right-turn lane, which the right-turn vehicle encounters after turning right, and wherein the dangerous situation prediction information comprises primary dangerous situation prediction information including a dangerous situation type-wise severity of the primary crosswalk, and secondary dangerous situation prediction information including dangerous situation type-wise severity of the secondary crosswalk.

10. The apparatus of claim 9, wherein the safety control signal for the first time point is generated based on dangerous situation prediction information inferred before the first time point by using the prediction model, and is applied to the road at the first time point.

11. The apparatus of claim 9, wherein the at least one processor is further configured to execute the at least one program to calculate dangerous situation measurement information for the second time point, based on road state information from the first time point to the second time point.

12. The apparatus of claim 11, wherein the at least one processor is further configured to execute the at least one program to generate training data, based on the road state information for the first time point, the dangerous situation prediction information for the second time point, and the dangerous situation measurement information for the second time point.

13. The apparatus of claim 12, wherein the prediction model is updated every update interval such that the loss function has a minimum value, based on the training data.

14. The apparatus of claim 9, wherein the video of the road comprises a safety control signal indicated on the road.

15. The apparatus of claim 11, wherein the dynamic information is information about movements of a vehicle and a pedestrian included in the video of the road, and the dangerous situation measurement information is quantitatively calculated based on the dynamic information.

16. The apparatus of claim 9, wherein the road state information further comprises at least one of traffic signal information of the road and environment information of the road.

17. A computer-readable recording medium having recorded thereon a program for executing the method of claim 1 on a computer.

* * * * *